E. Gaylord,
Accouterments,
Nº 28,269.    Patented May 15, 1860.
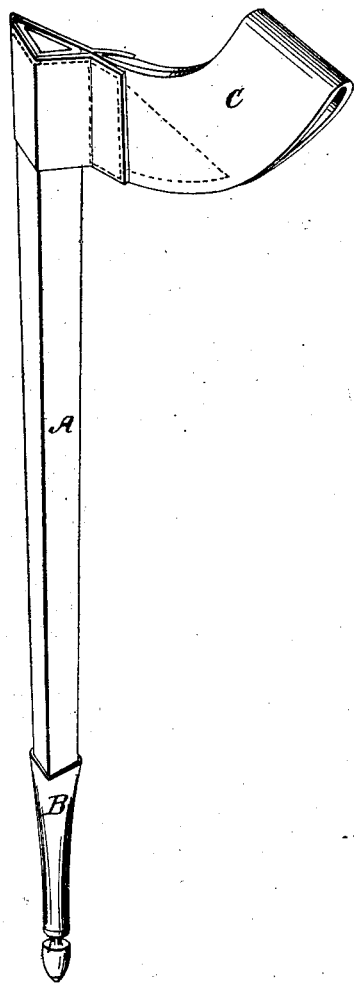
Witnesses.
E. Cohen.
I. Hirsch.
Inventor.
Emerson Gaylord
per atty A. B. Stoughton.

UNITED STATES PATENT OFFICE.

EMERSON GAYLORD, OF CHICOPEE, MASSACHUSETTS.

MANUFACTURE OF BAYONET-SCABBARDS.

Specification of Letters Patent No. 28,269, dated May 15, 1860.

*To all whom it may concern:*

Be it known that I, EMERSON GAYLORD, of Chicopee, in the county of Hampden and State of Massachusetts, have invented or discovered a new and useful Method of Finishing Bayonet-Scabbards to Make Them Smooth, Hard, and Impervious to Water; and I do hereby declare the following to be a full, clear, and exact description of the same, reference being had to the accompanying drawing, making a part of this specification, and which represents one of the scabbards complete.

My invention consists in the manner in which I treat the scabbard, after it has been sewn up in the usual way, to give it form, rigidity, and beauty of finish, and at the same time make it impervious to water.

To enable others skilled in the art to make and use my invention, I will proceed to describe the same with reference to the drawings.

After the scabbard has been sewn up, it is drawn over a former made of metal, and moistened, or moistened and heated. I then have ready some animal or vegetable tallow, or wax, that will melt, at say from 150° to 160° of heat by Fahrenheit. This material is kept at a melted state—care being taken not to have it too hot, and being equally careful not to have the leather too moist, in which condition it is the more liable to burn. The leather in its heated, or its heated and moist condition is then saturated with this animal or vegetable tallow, or material, and with the former in it, is then put under a press furnished with a die of suitable shape, and subjected to heavy pressure, until the substance with which the leather has been saturated has become perfectly hard, when it may be removed. By this treatment a peculiarly hard and smooth finish is given to the scabbard, all its lines being sharp and straight, the seam flattened, and a degree of rigidity given to it not heretofore possessed by this kind of article. It is moreover impervious to water. Oils, or fluid compositions of matter will not serve the purpose. Vegetable tallow, I prefer; but animal tallow prepared, or divested of its olein, or bees-wax, may be used. The gums do not answer a good purpose as they cause the former, or the scabbard to stick in the die—the more fluid oils, prevent the scabbard from either receiving or retaining its form.

The necessity of the moisture is that, the leather may be pliable enough to be snugly rubbed down to the former. The heat is often applied to divest the leather of its moisture to prevent its burning when immersed in the melted vegetable tallow, or its equivalent composition "factitious wax", or bees-wax. Spermaceti may be used in some cases—or these named ingredients may be mixed. But in all cases the substance used for saturating the leather, should not melt, but continue to be hard, under any temperature of the natural atmosphere.

The scabbard A, is finished or furnished with the usual socket B, and strap C, for the belt to pass through.

The heat used in the process may be that only which the leather receives from being immersed in the tallow at say 160°, though it may be at a higher temperature than this. The heat, moisture, and saturation prepares the leather; the heavy pressure and the cooling completes the operation.

Having thus fully described the nature and object of my invention what I claim as new and desire to secure by Letters Patent is—

A bayonet scabbard shaped and finished by the application of moisture, heat, saturation, and pressure, as herein stated, for the purpose of giving it form, rigidity, and a highly polished surface, and making it impervious to water, as set forth.

EMERSON GAYLORD.

Witnesses:
A. B. STOUGHTON,
E. COHEN.